(No Model.) 2 Sheets—Sheet 1.

H. C. AHRBECKER.
PISTON WATER METER.

No. 363,973. Patented May 31, 1887.

Witnesses.
Jo. L. Coombs
Geo. W. Rea.

Inventor
Henry C. Ahrbecker
By James L. Norris
atty.

(No Model.) 2 Sheets—Sheet 2.

H. C. AHRBECKER.
PISTON WATER METER.

No. 363,973. Patented May 31, 1887.

Witnesses:
Jo. L. Coombs
Geo. H. Rea

Inventor,
Henry C. Ahrbecker
By James L. Norris.
Atty.

UNITED STATES PATENT OFFICE.

HENRY C. AHRBECKER, OF STAMFORD STREET, COUNTY OF SURREY, ENGLAND.

PISTON WATER-METER.

SPECIFICATION forming part of Letters Patent No. 363,973, dated May 31, 1887.

Application filed February 9, 1887. Serial No. 227,047. (No model.) Patented in England March 20, 1886, No. 3,948, and in Belgium December 11, 1886, No. 75,567.

*To all whom it may concern:*

Be it known that I, HENRY CONRAD AHRBECKER, a citizen of England, residing at Stamford Street, in the county of Surrey, England, have invented a new and useful Liquid Meter, (for which I have obtained a patent in Great Britain, March 20, 1886, No. 3,948, and in Belgium December 11, 1886, No. 75,567,) of which the following is a specification.

My invention relates to the construction of a meter for measuring and registering the quantity of water or other liquid that passes through it, the chief objects which I have in view being to insure true measurement, notwithstanding great variations in the pressure of the liquid or the rate of its flow, and to give facility for accurate adjustment. For this purpose I construct the meter as I will describe, referring to the accompanying drawings.

Figure 2:
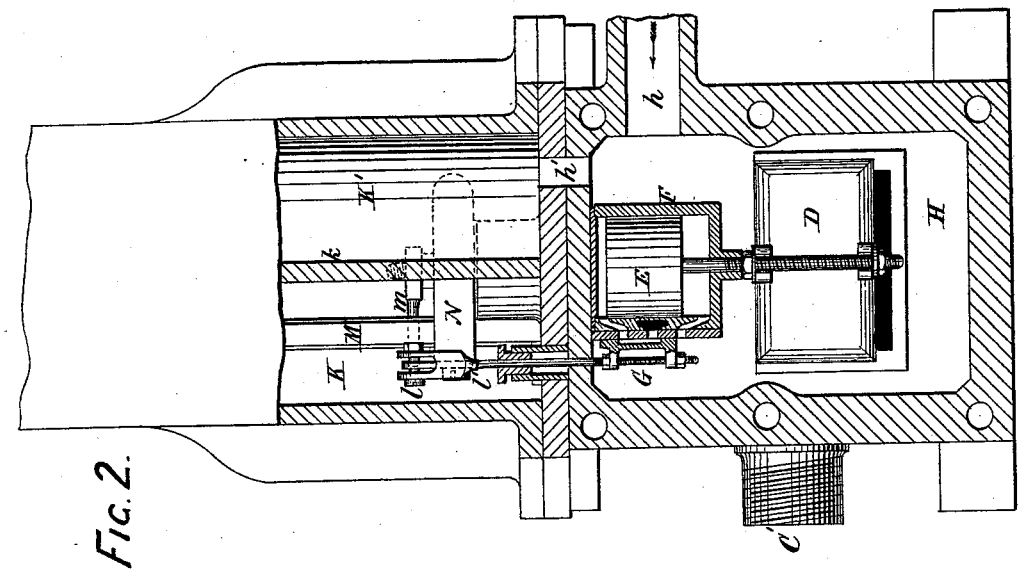
Figure 1:
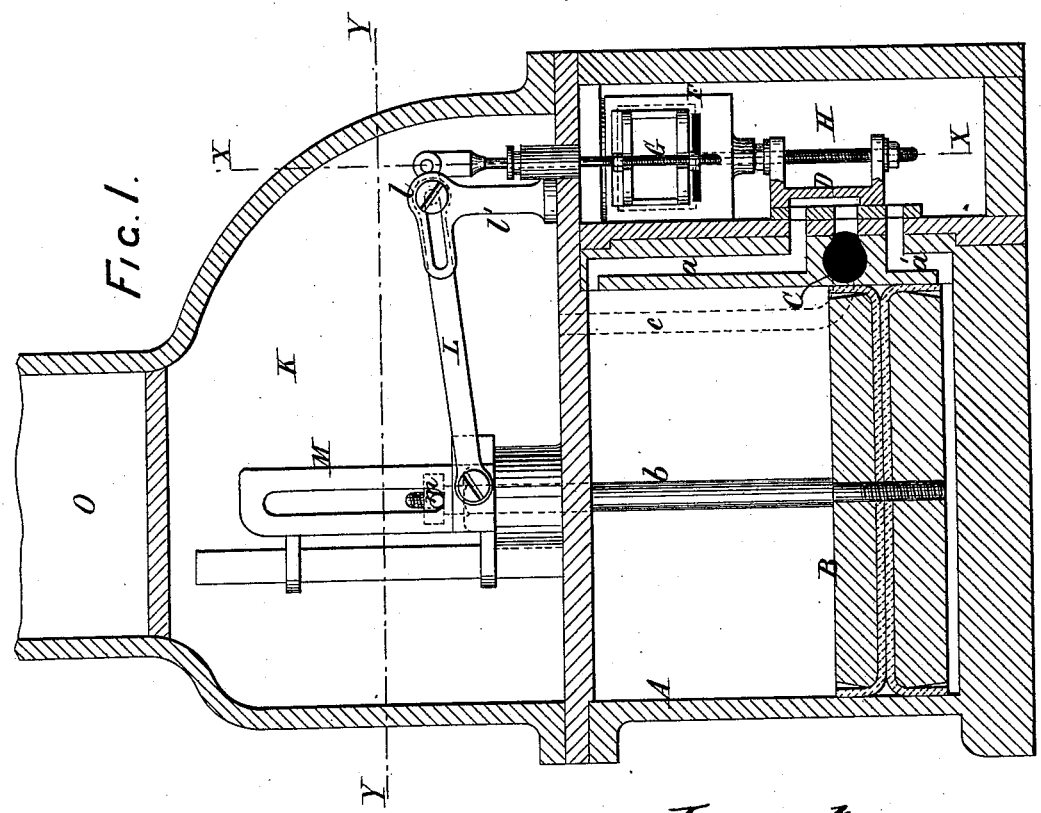
Figure 3:
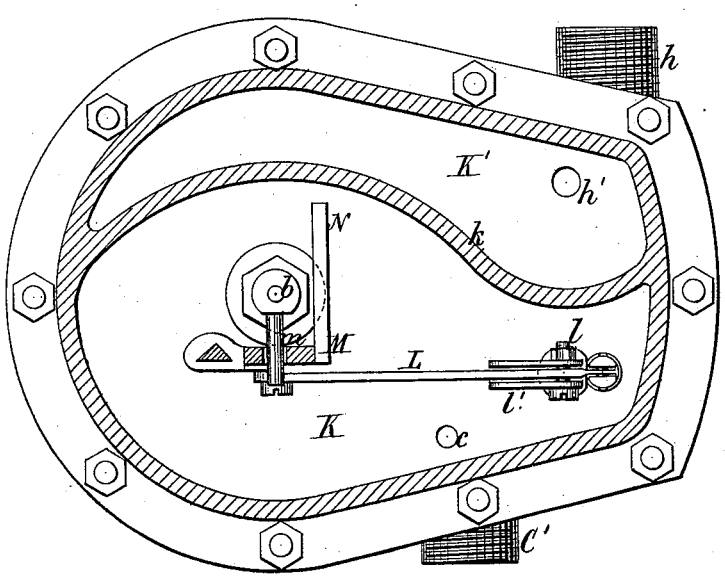

Figure 1 is a longitudinal section. Fig. 2 is a transverse section on the line X X of Fig. 1, and Fig. 3 is a sectional plan on the line Y Y.

A cylinder, A, fitted with a packed piston, B, has ports $a$ $a'$ to each end of it, and an outlet-port, C, governed by a slide-valve, D, which, as in a steam-engine, alternates by its movement the supply and discharge for each end of the cylinder A. The slide D is rigidly connected to a piston, E, in a small subsidiary cylinder, F, which in like manner has ports governed by a slide-valve, G. The cylinder F and its slide-valve G, as well as the main slide-valve D, are situated within the side case, H, to which the liquid is supplied by the pipe $h$.

Within one compartment, K, of a dome above the cylinder A, (which dome is divided into two compartments, K and K', by a partition, $k$,) a lever, L, is mounted on a pivot, $l$, that can be shifted in slotted holes of the lever L and of the standard $l'$, which carries it. To the one end of the lever L is linked the slide-valve G. The other end of L is jointed to a vertically-guided slide-bar, M, in a slot of which moves a pin, $m$, projecting laterally from the rod $b$ of the piston B. The slot in M being of less length than the full stroke of the piston B, as that piston approaches each end of its stroke its pin $m$ moves the slide-bar M, and this movement, transmitted through the lever L, shifts the slide-valve G. The auxiliary piston E thereupon moves, shifting the main slide-valve D, and the pressure on the piston B being thus reversed, that piston is made to move through its return-stroke. An arm, N, projecting laterally from M, moves a pawl-lever arranged in any convenient manner to act on a ratchet-wheel geared to counter mechanism, which is inclosed in the upper part, O, of the dome; but as this is no part of my invention, but an ordinary and well-known arrangement whereby the reciprocation of some moving part of an engine or meter is made to register by indices on dials or otherwise the number of strokes, I do not show it in the drawings, nor found any claim upon it.

The compartment K of the dome communicates by a passage, $c$, with the discharge-passage C', and the compartment K' communicates by a passage, $h'$, with the interior of the side case, H.

Each compartment of the dome acts as an air-vessel to relieve shock—K acting thus on the discharge, and K' on the supply. By shifting the pin $l$ along the slots of L and $l'$, the stroke of the subsidiary slide G can be increased or diminished, the effect of which is to shorten or lengthen the stroke of the main piston B. Thus, for instance, if the stroke of G be increased by shifting the pin $l$ back toward the left, then as the piston B is approaching the end of its stroke, its pin $m$, having reached the end of the slot in M, sooner shifts the slide-valve G, and the piston E is the sooner acted on to shift the main slide-valve D, causing reversal of the movement of the main piston B at a greater distance from the end of the cylinder A; and, conversely, if the stroke of G be lessened, the piston B has to go nearer to the end of the cylinder A before its movement undergoes reversal. Thus, by shifting the pin $l$, the stroke or displacement of the piston B can be varied, and in this manner the quantity of liquid delivered at each stroke can be accurately adjusted to suit the mechanism of the counter in O and the graduation of the dials employed to indicate the delivery.

Having thus described the nature of my invention and the best means I know for carrying the same into practical effect, I claim—

1. A liquid-meter wherein a piston is caused to reciprocate in a cylinder by the pressure of the liquid, the reciprocation being controlled by a slide-valve worked by the piston of a subsidiary cylinder, the slide-valve of which is shifted by a lever moved by the main piston as it approaches each end of its stroke, substantially as herein described.

2. A liquid-meter comprising a cylinder, a piston caused to reciprocate in said cylinder by the pressure of the liquid, the reciprocation being controlled by a slide-valve worked by the piston of a subsidiary cylinder having a slide-valve, a lever moved by the main piston as it approaches each end of its stroke for shifting the slide-valve of the subsidiary cylinder, and a fulcrum, $l$, for said lever, adapted to be shifted for the purpose of adjusting the displacement of the main piston, substantially as described.

In testimony whereof I have signed my name to this specification, in the presence of two subscribing witnesses, this 25th day of January, A. D. 1887.

H. C. AHRBECKER.

Witnesses:
OLIVER IMRAY,
Patent Agent, 28 Southampton Buildings, London, W. C.
JNO. P. M. MILLARD,
Clerk to Messrs. Abel & Imray, Consulting Engineers and Patent Agents, 28 Southampton Buildings, London, W. C.